United States Patent [19]

Schmaling

[11] Patent Number: 4,793,727
[45] Date of Patent: Dec. 27, 1988

[54] TWO-STEP COMPOSITE JOINT

[75] Inventor: David N. Schmaling, Oxford, Conn.

[73] Assignee: United Technologies Corporation, Hartford, Conn.

[21] Appl. No.: 52,304

[22] Filed: May 21, 1987

[51] Int. Cl.$^4$ .............................................. F16D 1/00
[52] U.S. Cl. ..................................... 403/340; 52/592
[58] Field of Search ................... 403/339, 340; 52/806, 52/592, 309.9

[56] References Cited

FOREIGN PATENT DOCUMENTS 640458  3/1964  Belgium ............................. 52/309.9
272272  8/1964  Netherlands ....................... 52/309.9

Primary Examiner—Andrew V. Kundrat

[57] ABSTRACT

A two-step composite joint that has improved strength to withstand both axial and bending loads. The joint comprises two articles each comprising a filler layer disposed between first and second composite layers. An end section of the first article's first composite layer is disposed external to, overlapping and bonded to an end section of the second article's first composite layer to form a first overlap. An end section of the second article's second composite layer is disposed internal to, overlapping and bonded to an end section of the first article's second composite layer to form a second overlap. The first overlap is displaced across the thickness and along the length of the joint from the second overlap. Loads are transferred across the joint from first layer to first layer and from second layer to second layer.

2 Claims, 2 Drawing Sheets

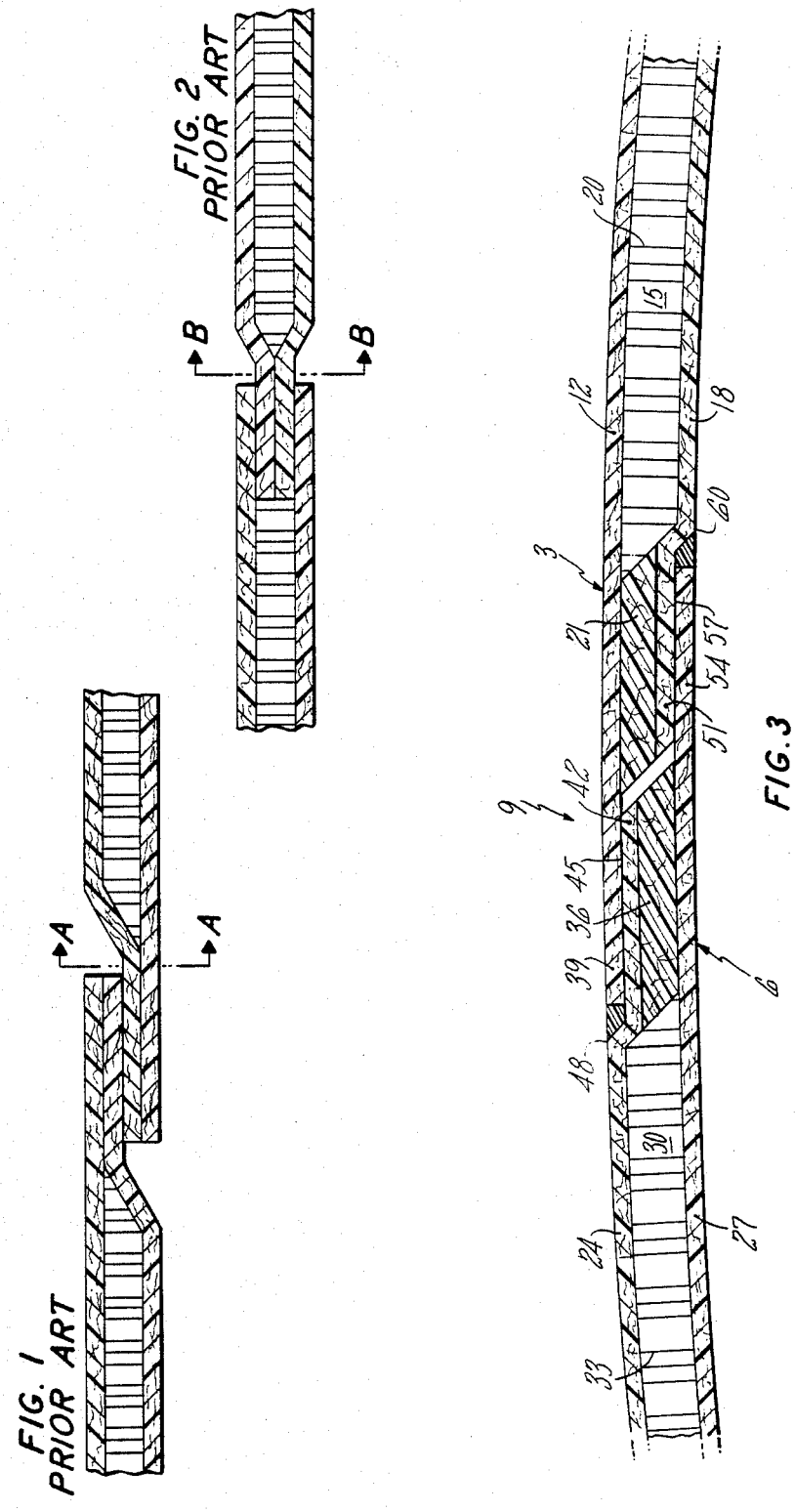

TWO-STEP COMPOSITE JOINT

This invention was made with Government support under Contract NAS 2-11771 awarded by National Aeronautics and Space Administration. The Government has certain rights in this invention.

TECHNICAL FIELD

The field of art to which this invention pertains is composite articles particularly composite joints.

BACKGROUND ART

Composites are increasingly used in aerospace technology as a replacement for metals. In airplanes and helicopters, composites are an improvement over metals as they are lightweight, strong, durable and can be manufactured economically. Many aircraft composite components are comprised of sandwich structures having two composite skins surrounding a filler material (e.g., honeycmmb, foam).

In many applications, composite sandwiches must be joined together. There are a variety of joints that may be used. FIGS. 1 and 2 illustrate common bonded joints involving single and double overlaps, respectively. Although these bonds can be adequate for some applications, both examples have a a large reduction in bending stiffness across sections A—A and B—B. Although the double overlap design has twice the effective bond length as the single overlap, it is extremely difficult to fabricate.

Accordingly, there has been a constant search in the field of aircraft composite components for joints having improved strengths to withstand axial loads as well as bending loads.

DISCLOSURE OF THE INVENTION

The invention is directed to a two-step composite joint that has improved strength to withstand both axial and bending loads. The joint comprises two articles each comprising a filler layer disposed between first and second composite layers. An end section of the first article's first composite layer is disposed external to, overlapping and bonded to an end section of the second article's first composite layer to form a first overlap. An end section of the second article's second composite layer is disposed internal to, overlapping and bonded to an end section of the first article's second composite layer to form a second overlap. The first overlap is displaced across the thickness and along the length of the joint from the second overlap. Loads are transferred across the joint from first layer to first layer and from second layer to second layer.

The foregoing and other objects, features and advantages will be apparent from the specification, claims and from the accompanying drawings which will illustrate an embodiment of the invention.

BRIEF DESCRIPTION OF THE DRAWINGS

FIG. 1 is a sectional view of a prior art composite sandwich joint involving a single overlap.

FIG. 2 is a sectional view of a prior art composite sandwich joint involving a double overlap.

FIG. 3 is a sectional view of a two-step composite sandwich joint involving a double overlap.

BEST MODE FOR CARRYING OUT THE INVENTION

Figure 4:
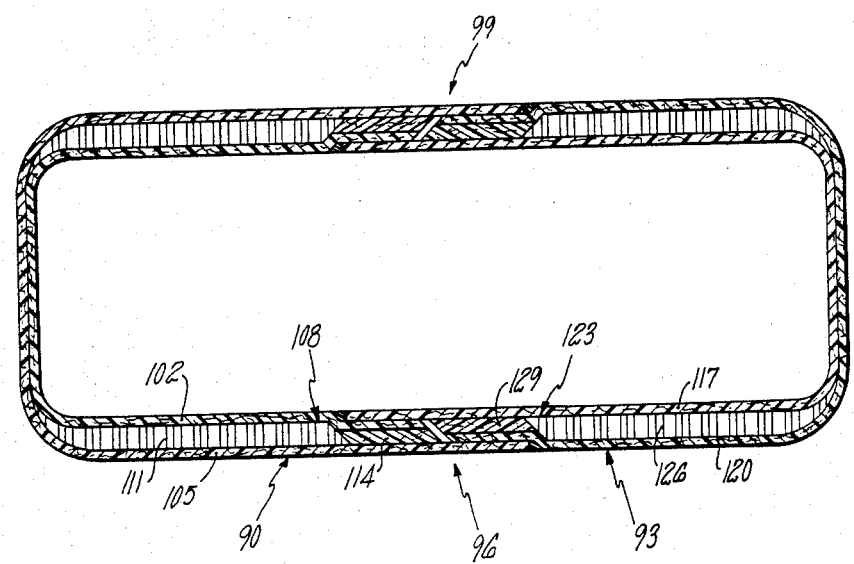
FIG. 4 is a side view of a helicopter main rotor blade main spar structure showing two composite C-sections joined at two of the two-step joints described in FIG. 3.

According to FIG. 3, a first composite sandwich 3 is joined to a second composite sandwich 6 at a joint 9. Each composite sandwich comprises a filler layer disposed between two composite layers. Typically, the filler layers may comprise honeycomb, foam, a composite, etc. or combinations thereof. Typically, the composite layers are graphite epoxy composites although other fiber matrix combinations could also be used.

A first composite sandwich 3 has a first composite layer 12, a filler layer 15 and a second composite layer 18. The filler layer 15 comprises a honeycomb portion 20 which is disposed coplanar, adjacent and internal to a composite portion 21 and is bonded to the same. A second composite sandwich 6 which is similar to the first has a first composite layer 24, a second composite layer 27 and a filler layer 30. The filler layer 30 comprises a honeycomb portion 33 which is disposed coplanar, adjacent and internal to a composite portion 36 and is bonded to the same.

The composite sandwiches are joined at suitable ends forming a two-step joint 9. An end section 39 of the first article's first layer 12 extends from the first composite 3 beyond filler layer 21 and overlaps an end section 42 of the first layer 24 of the second article 6 to form a first overlap (step) 45. The area of the first step can be sized so that, in conjunction with the second step described below, it is sufficient for the particular application. The composite filler portion 36 of the second article is internal to the first overlap 45. The first layer 24 of the second article makes a jog, (e.g., extends inwardly) at a point 48 prior to the overlap section 45 and the end section 42 is internal to (e.g., inside) the end section 39. Any jog angle greater than about 45° (from the plane of the layer 24) increases interlaminar shear stresses beyond a desirable level. Typically, the external surface of the first article's first composite layer 12 is substantially coplanar with the external surface of the second article's first layer 24 so that an aerodynamic surface is presented. At the jog point 48 a gap is created which may be filled in with a conventional resin so that an aerodynamic surface is presented.

Similarly, the second step or overlap of the two-step joint is formed as follows. An end section 51 of the first article's second layer 18 overlaps an end section 54 of the second layer 27 of the second article 6 to form a second step 57. The end section 54 of the second layer 27 of the second article 6 extends from the second article beyond the filler layer 36. The second step 57 is displaced across the thickness and along the length of the joint 9 from the first step 45. The area of the second step in conjunction with the first overlap (described above) should be of sufficient size to provide the strength for the desired application. The composite filler portion 21 of the first article is internal to the second step 57. The second layer 18 of the first article makes a jog, (e.g., extends inwardly) at a point 60 prior to tee second step section 57 so that the end section 51 is internal (e.g. inside) to the end section 54. Any jog angle greater than about 45° (from the plane of the layer 18) increases interlaminar shear stresses beyond a desirable level. Typically, the external surface of the first article's second composite layer 18 is substantially coplanar with the external surface of the second article's second layer 27 so that an aerodynamic surface is presented. At the jog point 60 a gap is created which may be filled in with a conventional resin so that an aerodynamic surface is presented.

The composite layers 12, 18, 24 and 27 may comprise a mixture of lamina oriented at fiber angles of 90° and ±45° (where the 90° direction is across the joint and the 0° direction is into the plane of the figure). Such layup would give the composite sandwich structure strength to withstand bending, axial and inplane shear loads typical of a structure used in aircraft applications. The composite portions 21, 36 of the filler layers 30, 15 are preferably ±45° graphite laminates which act as spacers to maintain a large portion of the bending stiffness of the composite sandwich structure while providing a stiff laminate relative to end sections 39, 54, thus reducing peak adhesive shear stresses. End sections 39, 54 that are thinner than both the composite layer from which the end section extends or the composite layer to which it is bonded result in a greater uniform distribution of bondline tension stresses due to applied bending loads.

These joints may be used for a variety of applications in the aerospace industry. An exemplary application is illustrated in FIG. 4, which depicts a rotor blade main spar structure. In FIG. 4 a leading edge C-section 90 is bonded to a trailing edge C-section 93 at two of the above described two-step joints 96, 99. The leading edge C-section 90 has an inner composite layer 102 and an outer composite layer 105 surrounding a filler layer 108 comprising honeycomb 111 and a graphite filler pack 114 comprised of fiber orientations ranging from 0° to ±45° (with 0° being into the plane of the figure). A pack comprised of fibers oriented across the joint is not acceptable (i.e., 90°). The trailing edge C-section 93 has an inner composite layer 117 and an outer composite layer 120 surrounding a filler layer 123 comprising honeycomb 126 and a soft graphite filler pack 129 similar to 114. This blade assembly facilitates fabrication since both the inner composite layers 102, 117 and both the outer composite layers 105, 120 can be individually formed on four male tools. The composite layers can then be transferred to two female tools during which the honeycomb 111, 126 and graphite filler packs 114, 129 are installed. Preliminary testing on the above described two-step joints has shown excellent strength. The joints carried high bending loads because the two C-sections were jointed to form a large unsupported panel acted on by aerodynamic forces. Testing predicted infinite life for this joint under applied bending moments typical of a helicopter main rotor blade. Crack initiation occurs at the joggle points 48, 60 resulting in a redistribution of the loads. In addition, bondline failure has never preceded graphite crack initiation.

The joint 9 provides a variety of advantages. Principally, loads are transferred across the composite layers that are bonded together instead of across the thickness of the joint. Thus, the loads are in a straight line minimizing prying forces and kick moments due to an offset in the lines of force.

This joint provides high strength in bending (e.g., more uniform distribution of tension stresses) and tension (e.g., low peak shear stresses) and a minimal reduction in bending stiffness. Further, it is easy to manufacture, has minimal weight, and provides an aerodynamic surface.

It should be understood that the invention is not limited to the particular embodiment shown and described herein, but that various changes and modifications may be made without departing from the spirit or scope of this concept as defined by the following claims.

I claim:

1. A two-step joint comprising:
   (a) a first article comprising a filler layer disposed between first and second composite layers;
   (b) a second article comprising a filler layer disposed between first and second composite layers;
   (c) an end section of said first article's first layer disposed external to, overlapping and bonded to an end section of said second article's first layer to form a first overlap wherein said second article's first layer extends inwardly prior to said first overlap;
   (d) an end section of said first article's second layer disposed internal to, overlapping and bonded to an end section of said second article's second layer to form a second overlap; and
   (e) said first overlap displaced across the thickness and along the length of the joint from said second overlap; whereby loads are transferred across the joint from first layer to first layer and from second layer to second layer.

2. A two-step joint comprising:
   (a) a first article comprising a filler layer disposed between first and second composite layers;
   (b) a second article comprising a filler layer disposed between first and second composite layers;
   (c) an end section of said first article's first layer disposed external to, overlapping and bonded to an end section of said second article's first layer to form a first overlap;
   (d) an end section of said first article's second layer disposed internal to, overlapping and bonded to an end section of said second article's second layer to form a second overlap wherein said first article's second layer extends inwardly prior to said second overlap; and
   (e) said first overlap displaced across the thickness and along the length of the joint from said secured overlap;

whereby loads are transferred across the joint from first layer to first layer and from second layer to second layer.

* * * * *